United States Patent [19]

Santucci et al.

[11] 3,997,355

[45] Dec. 14, 1976

[54] SULFUR COMPOSITION

[75] Inventors: Lawrence E. Santucci, San Anselmo; Robert W. Campbell, Lafayette; Gar Lok Woo, Tiburon, all of Calif.

[73] Assignee: Chevron Research Company, San Francisco, Calif.

[22] Filed: Mar. 18, 1974

[21] Appl. No.: 452,490

[52] U.S. Cl. .............................. 106/275; 106/274; 106/281 R; 106/282; 106/287 SC
[51] Int. Cl.² .................................. C08L 95/00
[58] Field of Search ............ 106/274, 287 SC, 275, 106/281 R, 282

[56] References Cited

UNITED STATES PATENTS

| 3,465,064 | 9/1969 | Signouret | 106/287 SC |
|---|---|---|---|
| 3,721,578 | 3/1973 | Bennett et al. | 106/287 SC |
| 3,810,857 | 5/1974 | Garrigues et al. | 106/274 |
| 3,823,019 | 7/1974 | Dale et al. | 106/287 SC |

FOREIGN PATENTS OR APPLICATIONS

| 579,368 | 8/1946 | United Kingdom | 106/274 |

*Primary Examiner*—Lorenzo B. Hayes
*Attorney, Agent, or Firm*—G. F. Magdeburger; John Stoner, Jr.; W. Keith Turner

[57] ABSTRACT

A sulfur-based aggregate-asphalt composition prepared by a process comprising mixing aggregate with asphalt and a molten sulfur system, wherein the molten sulfur system is made by a method comprising heating a mixture of sulfur and a sulfur plasticizer. Dicyclopentadiene is a preferred material for plasticizing the sulfur. Preferably the sulfur system contains, in addition to the sulfur plasticizer, a fibrous filler such as glass fiber or asbestos, and an inorganic filler such as talc powder.

10 Claims, No Drawings

SULFUR COMPOSITION

BACKGROUND OF THE INVENTION

The present invention relates to a sulfur-based asphalt-aggregate composition useful as a concrete or as a construction or road-building material.

Compositions which contain asphalt, sulfur and mineral aggregate and which are prepared at a temperature between 120° and 160° C. are disclosed in U.S. Pat. No. 2,182,837. British Pat. No. 970,199 also discloses compositions containing asphalt, elemental sulfur and mineral aggregate. The compositions of both of the above-mentioned references are, in general, prepared by first mixing elemental sulfur and asphalt and then combining the sulfur-asphalt with aggregate.

Canadian Pat. No. 755,999 discloses "an improved bituminous paving composition consisting essentially of particulate inorganic aggregate, the void spaces between the aggregate particles being substantially filled with a continuous phase of asphalt having dispersed therethrough a discontinuous phase of elemental sulfur, the weight ratio of sulfur to asphalt being at least 1:1."

Canadian Pat. Nos. 781,353 and 744,626 are similar to the above-mentioned patents.

U.S. patent application Ser. No. 286,627 has been offered for license by the U.S. Bureau of Mines. Ser. No. 286,627 is directed to a coating composition prepared from elemental sulfur, dicyclopentadiene, glass fiber and talc.

A United Nations report entitled "Utilization of Sulfur and Sulfur Ores as Construction Materials in Guatemala" by Alan C. Ludwig dated July 14, 1969, Report No. TAO/GUA/4, describes preparation of a coating or mortar composition using elemental sulfur, fibers such as asbestos and a plasticizer such as LP-3 (trademark for an organic polysulfide polymer product of Thiokol Chemical Corp.), or dipentene as a plasticizer. Dicyclopentadiene was also suggested in the report as a plasticizer, although it was not used because it was not locally available. According to the report, for testing purposes 3 concrete blocks were butted end-to-end, and the exterior of the joints was painted over with a coating to a thickness of approximately 1 to 2 mm. The joints thus obtained were sufficient to support the weight of a man.

U.S. Pat. No. 3,306,000, to M. D. Barnes, is similar to the above-mentioned report. The formulation used in the Barnes patent to hold concrete blocks by painting on the exterior thereof was a mortar consisting of sulfur, fibers such as glass fibers and a plasticizer such as LP-3.

SUMMARY OF THE INVENTION

According to the present invention, a sulfur-based aggregate-asphalt composition is provided by a process comprising mixing aggregate with molten asphalt and a molten, plasticized sulfur, wherein the plasticized sulfur is prepared by a method comprising heating sulfur with a sulfur plasticizer. Preferably the aggregate is mixed with asphalt before being mixed with the molten, plasticized sulfur system. Preferably the aggregate is heated to a temperature between 35° and 260° C., more preferably between 100° and 200° C., before it is mixed with the asphalt or asphalt-plasticized sulfur.

Preferably the sulfur system also contains a fibrous filler and/or an inorganic filler such as a powder, most preferably both. Glass or asbestos are preferred fibrous fillers. Talc powder is a preferred inorganic filler.

Among other factors, the present invention is based on our finding that sulfur-based asphalt-aggregate compositions prepared in accordance with the present invention are much more resistant to cracking upon subjecting the composition to freeze-thaw cycles than, for example, a composition similarly prepared but with no asphalt. Also, we have found that a preferred composition prepared in accordance with the present invention has the advantageous properties of a material, sometimes referred to as "Gussasphalt," an asphalt-aggregate composition having a high fines content, i.e., high mineral-aggregate fines content, but yet without using the high fines content used in Gussasphalt-type preparations. Still further, we have found that our low-fines-content composition has a relatively low viscosity and can be prepared at temperatures below about 190° C., instead of the temperatures of 200°–235° C. which are customary for Gussasphalt-type preparations.

The term "aggregate" as used herein means sand, gravel, crushed stone, slag, or other material of mineral composition. The aggregate preferably has a particle sized in the range of about 2 inches to and including material that passes through a 200-mesh screen, and as small as 5 microns in size, more preferably ¾ inch through 200 mesh (U.S. Standard Sieve size). Either siliceous or limestone mineral aggregate may be used, such as fine sand and/or crusher dust, crushed granite, cement slag, or mixtures thereof.

The term "fines" is used herein to mean aggregate material sufficiently fine to pass through a sieve size of 200 mesh.

In accordance with a preferred embodiment of the present invention, a sulfur-based aggregate-asphalt composition is prepared by steps comprising mixing molten asphalt and molten, plasticized sulfur with heated aggregate, wherein the aggregate contains less than 5 weight percent fines and wherein at least 5 weight percent of the composition is asphalt.

Preferably the fines content is below 2 weight percent. Preferably the asphalt content is relatively high, between 6 and 9 weight percent of the composition. This preferred material provides a substance with a very low void fraction and which is attractive for surfacing bridge decks, roads, and the like. The mineral aggregate fines content is exclusive of the inorganic fillers which may be used in the sulfur system. However, such inorganic fillers plus the mineral aggregate fines present in the subject preferred material usually and preferably are below about 20 weight percent of the composition. Gussasphalt-type preparations usually have about 20 weight percent fines.

The term "asphalt" is used herein to mean, as defined by the American Society for Testing Materials, a dark-brown to black cementitious material, solid or semi-solid in consistency, in which the predominating constituents are bitumens, and which occurs in nature as such or is obtained as residua in refining petroleum. Native asphalts include asphalts such as Trinidad Lake asphalt; asphalts obtained as residua in refining include asphalts obtained from (atmospheric) tower reduced crude or from vacuum distillation residua. Various types of asphalts are outlined on page 763 of the Kirk-Othmer Encyclopedia of Chemical Technology, 2d Ed., Vol. 2.

Preferably the asphalt in the sulfur-aggregate-asphalt composition is 10 to 300, more preferably 20 to 120, penetration. The term "penetration" refers to a standard test as described in ASTM D5-65 for measuring the distance in tenths of a millimeter that a standard needle penetrates vertically into a sample of the asphalt under fixed conditions of temperature, load and time.

Sulfur plasticizers are well known in the sulfur art (see Alberta Sulfur Research, Ltd., Quarterly Bulletin, Vol. VIII, No. 4, January-March 1972), and frequently include compounds having one or more sulfur atoms in the molecule. The "plasticizer" added to plasticize sulfur is actually, in many instances, a plasticizer precursor, which reacts with sulfur to form a plasticizer composition. Thus, compounds such as dicyclopentadiene, cyclopentadiene, styrene and phenol are for purposes of simplification herein referred to as sulfur plasticizers, whereas in a more strict technical sense they are precursors of sulfur plasticizer, the sulfur plasticizer being formed in situ. The term "sulfur plasticizer" is used herein to connote a substance which reduces the crystallinity of sulfur, thus resulting in a generally stronger, less brittle material.

Plasticized sulfur is prepared by a method comprising heating sulfur with a sulfur plasticizer, and usually has a lower melting point and a higher viscosity than elemental sulfur. Furthermore, plasticized sulfur requires a longer time to crystallize; i.e., the rate of crystallization of plasticized sulfur is slower than that of elemental sulfur. One useful way to measure the rate of crystallization is as follows: the test material (0.040 g) is melted on a microscope slide at 130° C. and is then covered with a square microscope slide cover slip. The slide is transferred to a hot-plate and is kept at a temperature of 78±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten, elemental sulfur, cause an increase in crystallization time in reference to the elemental sulfur itself. In one set of experiments, elemental sulfur required 0.44 minute to crystallize under the above conditions, whereas sulfur containing 3.8% of a phenol-sulfur adduct (as described in commonly assigned patent application Ser. No. 344,694) required 2.9 minutes. Sulfur containing 6.6% and 9.9% of the same phenol-sulfur adduct required 5.7 and 22 minutes, respectively.

Inorganic plasticizers include iron, arsenic and phosphorus sulfides, but the particularly preferred plasticizers are organic compounds such as styrene, α-methylstyrene, cyclopentadiene, dicyclopentadiene, and vinyl cyclohexene, the aromatic compound-sulfur adducts of Ser. No. 344,694 as well as the aromatic compounds used to produce these adducts, liquid polysulfides (e.g., those sold under the trade name of Thiokol LP-3 or LP-32), and the viscosity control agents described in U.S. Pat. Nos. 3,674,525, 3,453,125 and 3,676,166. The preferred aromatic plasticizing compound is the phenol-sulfur adduct of Ser. No. 344,694. The preferred aliphatic sulfur plasticizer is dicyclopentadiene.

The quantity of plasticizer to be added varies with the nature of the plasticizer, but usually is in the range 0.5 to 10 weight percent, based on the final composition. Polyunsaturated olefins such as dicyclopentadiene are preferably used at the 1- to 5-weight-percent level. The upper limit on plasticizer concentration is determined by the viscosity of the resulting plasticized sulfur. Final viscosity must be such that the composition will flow at the desired temperature and will also be able to be mixed with the asphalt-coated aggregate.

The fibrous fillers of the present invention are any of the natural or synthetic fibers having a melting point above the temperature of the molten sulfur-plasticizer composition. Usually the fibers are utilized in rather short lengths, e.g. from 1/16 inch to 1 inch, preferably ⅛ inch to ½ inch, in length. Natural fibers useful for the purpose include jute, hemp, wool, cotton, fibrous mica and asbestos. Synthetic fibers include glass fibers, rock wool, nylon, dacron, etc. Milled glass is the preferred fibrous filler. These fillers are utilized in amounts from about 0.5 to 10 weight percent, preferably 1 to 5 weight percent, based on total sulfur-system weight.

The inorganic fillers useful in the compositions of this invention are fine or powdery inorganic materials, preferably having an average particle size in the range 0.1 to 40 microns, more preferably 0.5 to 20 microns. Among the useful fillers are the talcs, micas, clays, alkaline earth metal sulfates such as calcium sulfate, kaolin, etc. The inorganic compounds which impart thixotropic properties to the sulfur-based composition are a particularly useful type of filler. These are usually flat, plate-like compounds such as some talcs and micas. Inorganic fillers are useful in dispersing the fibrous filler and in increasing the viscosity of the plasticized sulfur system. Fillers are generally present in from about 1 to 20, preferably 5 to 15, weight percent, based on total sulfur system. The preferred inorganic filler is talc.

Preferably the sulfur system used in the composition of the present invention comprises the reaction product of about 50 to 97 weight percent sulfur and about 1 to 50, more preferably 1 to 10, weight percent plasticizer. Preferably the sulfur system also contains about 1 to 5 weight percent fibrous filler and about 1 to 20 weight percent inorganic filler.

Particularly preferred amounts of the components of the sulfur system are 80–93% sulfur, 1–3% dicyclopentadiene, 1–3% glass fibers, and 5–10% talc. Another desirable formulation is composed of about 60% sulfur, 30–40% of a phenol-sulfur adduct having about 30% phenol, and 2–5% glass fibers.

Preferably the sulfur system is 5 to 30, more preferably 10 to 25, weight percent of the product sulfur-aggregate-asphalt composition. Thus the composition is a sulfur-based composition. Preferably the aggregate is 60 to 94.5, more preferably 67 to 89, weight percent of the product composition. Preferably the asphalt is 0.5 to 10, more preferably 1 to 8, weight percent of the product composition.

The composition of the present invention is advantageously used for building roads — that is, for paving — for construction pads or landing pads, such as helicopter landing pads, etc. The composition of the present invention is particularly advantageous for such uses as previously mentioned in climates subject to freezing and thawing.

In general terms, and in accordance with a preferred embodiment of the present invention, the sulfur-aggregate-asphalt composition is prepared as follows:

Elemental sulfur is charged to a kettle or reaction vessel and is heated to above the melting point, usually in the range 140°–155° C. Then the plasticizer, e.g. dicyclopentadiene, is added carefully and preferably below the surface of the sulfur. The resulting reaction mixture is stirred, usually within the above temperature range, for ½ hour to 24 hours. Next, the inorganic filler and the fibrous filler are added, either together or one after the other. The entire mass is then stirred for an additional ⅛ to 24 hours.

Meantime, in another kettle or reaction vessel the desired heated agregate is stirred and mixed with hot asphalt. This is carried out in the conventional asphalt-aggregate apparatus and at the temperatures usual for preparing asphalt-aggregate mixtures. Mixing is accomplished within 1/6 to 180 minutes, preferably in ½ to 3 minutes. Then the molten, previously prepared, sulfur-based composition (now at a temperature within the range 120°–160° C.) is added to the asphalt-aggregate, and mixing is continued for ½ to 2 minutes. No apparent change in mix behavior or properties is noted when the addition of molten asphalt to heated aggregate is followed immediately by the addition of molten sulfur-based composition and mixed in one operation for ½ to 3 minutes. The resulting sulfur-based asphalt-aggregate composition is poured into heated molds for making concrete-type blocks, or is laid on a previously prepared base for construction of roads, landing pads, etc. After cooling to ambient temperature, the product is ready for use.

EXAMPLES

EXAMPLE 1

A 5-liter, 3-necked flask, equipped with a stirrer, a thermometer, a condenser and a heating mantle was charged with 3930 g of molten elemental sulfur. The sulfur was adjusted to a temperature of 125° C., and then 79 g of dicyclopentadiene (commercial grade) was added. The resulting mixture was stirred at 137° C. for 4 hours. Then 393 g of talc (Mistron Vapor) and 118 g of milled glass (Owens-Corning 630–1/32) were added. Mixing was continued in the molten state until the mixture was uniform, about ¼ hour. It was then poured into a paper carton and allowed to solidify.

A Venezuelan asphalt (120 g, 85/100 penetration grade) and Cache Creek aggregate (4620 g, ranging in size from ¾ inch down to and through a 200-mesh screen) were heated and mixed at 132°–137° C. for about 2 minutes. The Cache Creek aggregate is a rounded gravel obtained from a pit near Sacramento, California. Then 1260 g of sulfur-based product prepared as above was melted and poured into the asphalt-aggregate mix. Stirring was continued for about 2 minutes until a uniform mixture was obtained. Then the entire mass was poured into a 3×5.5 5.5×15 inches mold and allowed to cool to room temperature.

Another test specimen was prepared in the same way, except that no asphalt was used in the preparation and the amount of sulfur-based product was 1380 g.

A third test specimen was prepared in the same way using no asphalt and 1380 g of elemental sulfur in place of the sulfur-based composition.

The 3 specimens were photographed, weighed and then placed in pans of water for 7 days. The specimens were then tested for freeze-thaw resistance by alternately freezing by exposure to −18° C. for 15 hours, and then exposure to +4° C. for 9 hours. After 16 cycles, the third specimen, prepared from elemental sulfur, had broken into pieces. After 31 cycles, the specimen without asphalt showed small cracks that increased in number and size throughout the test, which was terminated after 90 cycles. The first specimen, prepared from asphalt-coated aggregate and a sulfur-based composition, showed no damage at the end of this time.

EXAMPLE 2

A Venezuelan asphalt (84 g, 85/100 penetration grade) and Cache Creek plus Kaiser aggregate (1002 g, ranging in size from ⅜ inch down to but not passing a 200-mesh screen) were heated and mixed at 132°–137° C. for about 30 seconds. Then 168 g of sulfur-based product prepared as in Example 1 was melted and poured into the asphalt-aggregate mix. Mixing was continued for about 30 seconds until a uniform mix was obtained. Then the entire mass was poured into preheated cylindrical molds (4 inches diameter × 5 inches height), which were vibrated slightly to aid consolidation. The material and mold were then allowed to cool to room temperature. The completed sample size was approximately 4 inches diameter by 2.5–3 inches high.

Another test specimen was prepared in a similar way, except that 252 g of preblended asphalt and elemental sulfur was substituted for the asphalt and sulfur-based composition.

A third test specimen was prepared in a similar way, except 108 g of asphalt and no sulfur-based composition were used. In this case, 198 g of aggregate fines passing the 200-mesh screen was included, and the asphalt and aggregate were heated to 220°–235° C. for about 1 minute.

The resilient modulus ($M_R$), a recognized strength test for treated paving materials, was determined at 23° C. for the 3 specimens, using the equipment and procedure described in a Highway Research Board publication (Highway Research Record Number 404, pp. 22–32). The specimens were vacuum-saturated in water at 23° C. for about 15 minutes and then soaked in water for 30 days. The $M_R$ was determined on the specimens periodically during this soaking period. The initial $M_R$ of the third specimen was about 60,000 psi* and remained at that level throughout the soaking period. The specimen with elemental sulfur started at an $M_R$ of 150,000 psi* and gradually dropped to about 80,000 psi* after 30 days soaking, at which time the specimen cracked. The first specimen, containing asphalt and the sulfur-based composition, had an initial $M_R$ of 400,000 psi* and stayed at about this level throughout the soaking period.

*$N/M^2 = psi \times 6.895 \times 10^3$

What is claimed is:

1. A sulfur-based aggregate-asphalt composition prepared by a process comprising mixing aggregate with molten asphalt and a molten sulfur system, wherein the sulfur system is prepared by a method comprising heating sulfur at liquid molten sulfur temperatures with a sulfur plasticizer to thereby plasticize the sulfur, and wherein the amount of the sulfur system in the composition is between 1¼ and 25 parts sulfur system per 1 part asphalt, and wherein the sulfur system comprises 50 to 97 weight percent sulfur.

2. A composition in accordance with claim 1 wherein the sulfur system also contains a fibrous filler and an inorganic powder filler.

3. A composition in accordance with claim 1 wherein the sulfur system contains 1 to 5 weight percent glass fiber or asbestos as a fibrous filler.

4. A composition in accordance with claim 1 wherein the plasticizer is dicyclopentadiene.

5. A composition in accordance with claim 4 wherein the sulfur system comprises about 50–97 weight percent sulfur, about 1–10 weight percent dicyclopentadiene, about 1–5 weight percent glass fibers and about 1–20 weight percent of an inorganic particulate filler.

6. A composition in accordance with claim 2 wherein the sulfur system comprises about 80 to 95 weight percent sulfur, about 1 to 3 weight percent dicyclopentadiene, about 1 to 3 weight percent glass fibers and about 1 to 20 weight percent of an inorganic powder filler.

7. A composition in accordance with claim 1 wherein the asphalt is 20 to 120 penetration grade asphalt.

8. A composition in accordance with claim 1 wherein the amount of asphalt is between 0.5 to 10 weight percent, the amount of aggregate is between 60 and 94.5 weight percent, and the amount of plasticized sulfur is between 5 and 30 weight percent.

9. A composition in accordance with claim 1 wherein the aggregate is mineral aggregate having a size within the range 2 inches to 5 microns.

10. A composition in accordance with claim 8 wherein the aggregate has less than 10 weight percent fines.

* * * * *